Jan. 22, 1963 J. G. JENNE 3,074,731
ROCKING TOY
Filed Oct. 13, 1961 2 Sheets-Sheet 1
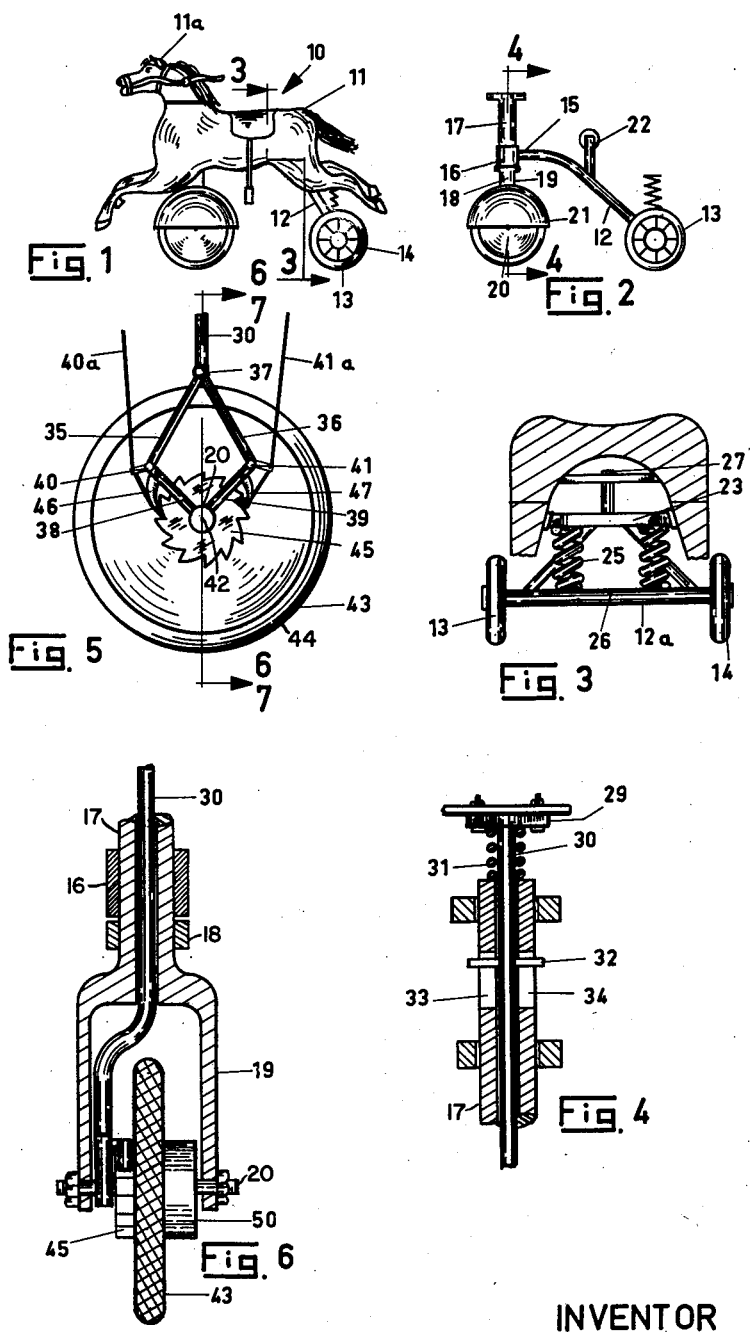
INVENTOR
John G. Jenne Jan. 22, 1963 J. G. JENNE 3,074,731
ROCKING TOY
Filed Oct. 13, 1961 2 Sheets-Sheet 2

INVENTOR.
John G. Jenne

United States Patent Office

3,074,731
Patented Jan. 22, 1963

3,074,731
ROCKING TOY
John G. Jenne, % Canadian Research and Development Foundation, 1434 Queen St. W., Toronto 3, Ontario, Canada
Filed Oct. 13, 1961, Ser. No. 115,680
Claims priority, application Canada May 27, 1961
3 Claims. (Cl. 280—1.196)

This invention relates to improvements in vehicular toys and more particularly to improvements in rocking horses, and the like.

A variety of types of rocking horses have been utilized by children some consisting of a figure of a horse located directly on curved runners, permitting a child sitting on the rocking horse to rock back and forth without thereby providing any movement of the horse forward or backward relative to the ground. Other types of rocking horses have been supplied with springs suspending the rocking horse in a rigid frame, the illusion of rocking on the horse being brought about by stretching or contracting a plurality of springs attached to each leg of the horse.

Still other types of rocking horses have been supplied with the figure of a horse mounted by means of spring loaded suspension bars within a rigid frame, allowing the child to simulate a rocking motion, or obtain the illusion of galloping, but failing to offer any actual forward or rearward motion.

Still other conventional types of rocking horses include tricycles supplied with pedals for forward or backward propulsion, the upper portion of the tricycle having the configuration of a horse, the main disadvantage of all these conventional toys being that the illusion of galloping on a horse attained therethrough is not sufficiently realistic, the rocking horse either staying on the spot and just rocking back and forth or being propelled as with the conventional bicycle by pedals, none of these systems leaving the child free to closely simulate the movements on a galloping horse, at the same time propelling the horse forward or backward.

It is an object of this invention to provide a rocking horse adapted to very closely simulate the action of a galloping horse, combined with relative movement of the horse in relation to the ground.

It is another object of this invention to provide a rocking horse containing directional control means, permitting the user thereby to change direction of movement relevant to the ground by turning the head of the horse thereby simulating actual action of a real horse.

It is still another object of this invention to provide a rocking horse supplied with propulsion means actuated by the rocking action of the horse without use of pedals or the like.

It is another object of this invention to provide a rocking horse supplied with propulsion means adapted to actuate the horse to move forward both on upward movement of the rocking action thereof and downward movement of the rocking action thereof.

It is still another object of this invention to simulate the galloping action of a conventional horse through intermittent impulses related by the rocker of the rocking horse to the propulsion means thereof, thereby giving the rocking horse a somewhat jerky movement forward or backward similar to the movement of a real horse.

These and other objects and features of this invention will become apparent when taken in conjunction with the accompanying drawings in which:

FIG. 1 is a side elevation of a rocking toy embodying this invention.

FIG. 2 is a side elevation of the rocking toy illustrated in FIG. 1, showing particularly the structural framework of the toy, and also the method of pivotally mounting the body of the horse thereto.

FIG. 3 is a transverse, sectional end elevation taken on line 3—3 of FIG. 1.

FIG. 4 is a part sectional vertical elevation taken on line 4—4 of FIG. 2.

FIG. 5 is a fragmentary, side elevation of actuating mechanism of a rocking toy embodying this invention.

FIG. 6 is a fragmentary, sectional, vertical elevation taken along line 6—6 of FIG. 5.

Figure 7:
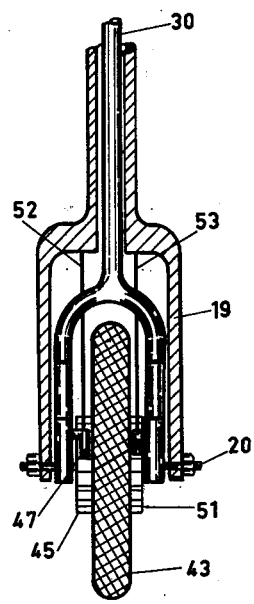
FIG. 7 is a vertical, cross-sectional view taken on line 7—7 of FIG. 5 illustrating particularly the use of a second set of pawls and ratchet gear to effect rearward motion.

Referring to FIG. 1 a rocking horse tricycle indicated generally by arrow 10 comprises a body portion 11 having, in this case, the configuration of a horse, body portion 11 being made for instance of light moldable material such as plastic, body portion 11 being pivotally connected to a supporting structure 12, the head 11a of body portion 11 being rotatably attached to body portion 11 on a vertical spindle, permitting head 11a to rotate in a horizontal plane.

Structure 12 is at its lower rear end supplied with two wheels 13 and 14.

Referring to FIG. 2, structure 12 comprises a substantially triangular frame, located generally angularly to the ground, having its apex 15 bent slightly downward to assume a position substantially parallel to the ground, thereby resembling the framework of a conventional tricycle. Supporting collar 16, of substantially cylindrical configuration, is attached rigidly to and extending outwardly from structure 12, at apex 15, in a position substantially perpendicular to the ground, is adapted to freely and slidably receive supporting post 17, which is freely rotatable therein. A supporting pad 18, located at the lower extremity of supporting post 17 and made to extend radially therefrom, is adapted to slidably receive collar 16. A front fork assembly 19, being of substantially conventional design, is extended downwardly from pad 18 in substantially parallel relationship to each other, in such a manner as to receive detachably attachable front wheel spindle 20. A front wheel guard 21, of conventional design is supplied, and may be attached by any conventional means. A rear support spindle 22 extending angularly upwards and substantially centrally from frame work 12, serves as a pivot point for the body of the horse, which will be pivotally mounted.

Referring to FIG. 3, a channel-like carrying bar 23, is located transversely and substantially to the rear of the horse, being conventionally attached thereto. It will be noted that this carrier bar is supported by a plurality of springs 25 extending downwardly to subjacent points of attachment on transversely mounted axle housing 26, carrying rear axle 12a, thereby providing a reciprocating, spring-like action for the rider.

Referring to FIG. 4, upper support pad 29, located within and attached to the horse's head by any suitable device, for instance, bars or links, detachably attaches to connecting rod 30, said rod 30 extending downwardly and longitudinally to, and concentrically with supporting post 17. A compressible spring 31, of conventional helical design, is placed about connecting rod 30 between supporting pad 29 and post 17, allowing rod 30 to reciprocate within the bore of post 17, under the influence of spring 31, but controlled in its movements by transverse pin 32, adapted to make a sliding fit in oppositely located slots 33 and 34 in post 17.

Referring to FIG. 5, jointed rods 35 and 36, being pivotally attached to connecting rod 30 at pivot point 37, and also two rods 38 and 39, at pivot points 40 and 41 respectively, rods 38 and 39 being adapted to pivot about point 42 on spindle 20. As the rider of the horse causes the horse to move downward forcing rod 30 to move in a downward direction rods 35 and 36 pivot at point 37, causing rods 35 and 36 and also rods 38 and 39 to be extended outwardly at pivot points 40 and 41, while the upward movement of connecting rod 30 causes rods 35 and 36 pivoting at point 37 and rods 38 and 39 pivoting at points 40 and 41 respectively to move inwardly. Thus it will be seen that rods 35, 36, 38 and 39 essentially form a pantograph having a "collapsing" action controlled by pin 32. A front wheel 44, being rotatably attached to spindle 20, and carrying a pawl gear 45 mounted concentrically, is positioned substantially centrally of front fork 19. Upon the downward movement of the horse, the pawl 46 is caused to engage in the forward edge of pawl gear 45, while an upward movement of the horse causes pawl 47 to engage with pawl gear 45 on its rearward edge, each movement causing a forward motion of the horse with relation to the ground. It will be noted that during the period of engagement of pawl 46 with pawl gear 45, pawl 47 is permitted to slide over the teeth of pawl gear 45, and during the period of engagement of pawl 47 with pawl gear 45, pawl 46 is permitted to slide over the teeth of pawl gear 45. Two draw cords 40a and 41a are attached to pawls 46 and 47 to permit manual withdrawal thereof from engagement with pawl gear 45 to disconnect wheel 43 from rocking action.

Referring to FIG. 6 it will be noted that a spacer block 50 is adapted to be detachably and rotatably attached to spindle 20, the removal of said spacer block 50 allowing the installation of necessary components to provide a backward motion to the vehicle.

Referring to FIG. 7 an alternative actuating mechanism is shown comprising a second pawl gear 51 attached on the opposite side of the wheel 43 thereby providing one pawl gear on each side of wheel 43, the teeth on pawl gear 45 being adapted to face in opposite direction to the teeth on pawl gear 51, fork 19 in this instance having duplicate sets of pawls located one set on each side of wheel 43, control cords 52 and 53 being adapted to alternately immobilize pawls adapted to engage with pawl gear 45 and pawl gear 51 respectively, engagement of pawl gear 45 during rocking action providing that rocking toy, for instance, moves forward whereas disengagement of pawl gear 45 and engagement of pawl gear 51 provides that rocking toy will move backwards during rocking action.

Figure 8:
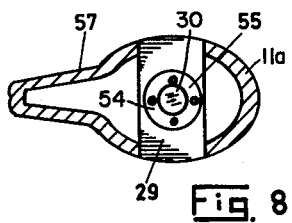
FIG. 8 is a reverse, part sectional plan view illustrating the attachment of the horse's head to upper support pad.

Referring to FIG. 8, one method of attaching head 11a to a transverse plate 29 is shown illustrating carrying plate 29 supplied with flange 54 that is rigidly attached to fork spindle 30.

Figure 9:
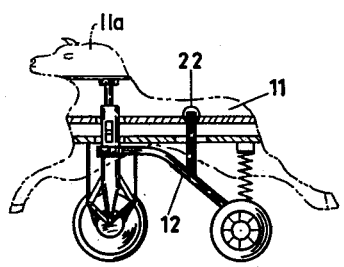
FIG. 9 is a side, part sectional view showing the horse in phantom, attached to the frame structure.

Referring to FIG. 9 the method of suspension of body 11 through pivot 22 to frame 12 is shown diagrammatically, body 11 being attached to frame 12 at this pivot location only.

The general design of the individual parts of my invention as explained above may be varied according to requirements in regards to manufacture and production thereof while still remaining within the spirit and principle of my invention without prejudicing the novelty thereof.

The embodiments of this invention in which an exclusive property or privilege is claimed are defined as follows:

1. A rocking toy comprising a support frame, a body pivotally attached to said support frame, a wheel carrying member journalled on said support frame, a steering element journalled on said body for rotation on a vertical axis, said body being pivotally attached a substantial horizontal distance from said journalled steering element, a wheel journalled substantially vertically below said steering element, a pawl gear attached to said wheel, pantograph mean detachably coupled to said gear, each half of said pantograph comprising an extreme end lever pivotally attached at one end to the axis of said wheel, the other end of said extreme end lever being pivotally attached to one end of a primary lever, the other end of said primary lever being pivotally attached to a vertically reciprocating rod attached to one end of said body, the primary levers of said pantograph being pivotally attached to the same location on said vertical rod, a pair of pawls respectively attached to said extreme end levers of said pantograph, both of said pawls being adapted to engage said pawl gear in the same direction of rotation, and spring means located at each end of said body adapted to bias said body to a neutral middle pivoting position.

2. A rocking toy as claimed in claim 1 in which cord means are supplied for selective manual retraction of said pawls for engagement with said gear.

3. A rocking toy as claimed in claim 1 in which said pawl gear means comprises two pawl gears, one located on each side of said wheel, teeth of one of said pawl gears being located in clock-wise direction, teeth of the other said pawl gears being located in anti-clock-wise direction, and control means to manually engage one set of pawls with said one pawl gear, said control means at the same time disengaging another set of walls from said second pawl gear, reversal means being incorporated in said manual control means to selectively manually reverse said engagement and disengagement of said pawls with said pawl gears.

References Cited in the file of this patent
UNITED STATES PATENTS

| | | |
|---|---|---|
| 105,701 | Liming | July 26, 1870 |
| 2,344,062 | Rinehart | Mar. 14, 1944 |